US011633682B2

(12) United States Patent
Janikowski et al.

(10) Patent No.: US 11,633,682 B2
(45) Date of Patent: Apr. 25, 2023

(54) NANOFIBER FILTER MEDIA FOR HIGH PERFORMANCE APPLICATIONS

(71) Applicant: Cummins Filtration IP, Inc., Columbus, IN (US)

(72) Inventors: Eric A. Janikowski, Jefferson, WI (US); Mark P. Adams, Madison, WI (US); Huanling Liu, Cookeville, TN (US); Himani Deshpande, Fitchburg, WI (US); Scott W. Schwartz, Cottage Grove, WI (US); Barry Mark Verdegan, Stoughton, WI (US); Aiden Kim, Suwon-si (KR); Anna Balazy, Columbus, IN (US); Nathan Shafer, Stoughton, WI (US)

(73) Assignee: CUMMINS FILTRATION IP, INC., Columbus, IN (US)

( * ) Notice: Subject to any disclaimer, the term of this patent is extended or adjusted under 35 U.S.C. 154(b) by 0 days.

(21) Appl. No.: 16/092,084

(22) PCT Filed: Apr. 18, 2017

(86) PCT No.: PCT/US2017/028157
§ 371 (c)(1),
(2) Date: Oct. 8, 2018

(87) PCT Pub. No.: WO2017/184615
PCT Pub. Date: Oct. 26, 2017

(65) Prior Publication Data
US 2019/0160405 A1 May 30, 2019

Related U.S. Application Data
(60) Provisional application No. 62/324,179, filed on Apr. 18, 2016.

(51) Int. Cl.
*B01D 39/16* (2006.01)
*B01D 29/11* (2006.01)
(Continued)

(52) U.S. Cl.
CPC ........ *B01D 39/1623* (2013.01); *B01D 29/114* (2013.01); *B01D 35/005* (2013.01);
(Continued)

(58) Field of Classification Search
CPC ............... B01D 39/1623; B01D 39/18; B01D 39/2017; B01D 35/005; B01D 46/24;
(Continued)

(56) References Cited

U.S. PATENT DOCUMENTS 4,650,506 A * 3/1987 Barris ................. D01D 5/0084
55/528
7,918,913 B2 4/2011 Kalayci et al.
(Continued)

FOREIGN PATENT DOCUMENTS

| CN | 101939072 | 1/2011 |
| CN | 103025404 | 4/2013 |

(Continued)

OTHER PUBLICATIONS

International Search Report and Written Opinion issued for PCT/US2017/028157, dated Jul. 18, 2017, 19 pages.
(Continued)

*Primary Examiner* — Liam Royce
(74) *Attorney, Agent, or Firm* — Foley & Lardner LLP

(57) ABSTRACT

Disclosed here is a composite filter media having at least one nanofiber layer bonded to a substrate layer, the at least one nanofiber layer optionally having a plurality of nanofibers
(Continued)

Composite Filter Media 100 having a geometric mean diameter of less than or equal to 0.5 μm, the at least one nanofiber layer having a thickness of about 1-100 μm.

14 Claims, 15 Drawing Sheets

(51) Int. Cl.
    *B32B 5/26*     (2006.01)
    *B01D 39/18*     (2006.01)
    *B01D 39/20*     (2006.01)
    *B01D 46/54*     (2006.01)
    *B32B 7/12*     (2006.01)
    *B32B 29/02*     (2006.01)
    *B32B 3/26*     (2006.01)
    *B32B 5/02*     (2006.01)
    *B01D 35/00*     (2006.01)
    *B01D 46/24*     (2006.01)
    *B32B 7/14*     (2006.01)

(52) U.S. Cl.
CPC ......... *B01D 39/18* (2013.01); *B01D 39/2017* (2013.01); *B01D 46/24* (2013.01); *B01D 46/546* (2013.01); *B32B 3/26* (2013.01); *B32B 5/022* (2013.01); *B32B 5/024* (2013.01); *B32B 5/26* (2013.01); *B32B 7/12* (2013.01); *B32B 7/14* (2013.01); *B32B 29/02* (2013.01); *B01D 2239/025* (2013.01); *B01D 2239/0654* (2013.01); *B01D 2239/083* (2013.01); *B01D 2239/1233* (2013.01); *B01D 2275/10* (2013.01); *B32B 2250/02* (2013.01); *B32B 2250/20* (2013.01); *B32B 2255/12* (2013.01); *B32B 2255/26* (2013.01); *B32B 2260/021* (2013.01); *B32B 2260/046* (2013.01); *B32B 2262/02* (2013.01); *B32B 2262/023* (2013.01); *B32B 2262/0223* (2013.01); *B32B 2262/0238* (2013.01); *B32B 2262/0246* (2013.01); *B32B 2262/0253* (2013.01); *B32B 2262/0261* (2013.01); *B32B 2262/0276* (2013.01); *B32B 2262/062* (2013.01); *B32B 2262/101* (2013.01); *B32B 2262/14* (2013.01); *B32B 2307/718* (2013.01); *B32B 2307/724* (2013.01); *B32B 2307/726* (2013.01); *B32B 2307/732* (2013.01)

(58) Field of Classification Search
CPC ................ B01D 46/546; B01D 29/114; B01D 2239/083; B01D 2239/025; B01D 2239/0654; B01D 2239/1233; B01D 2275/10; B32B 7/12; B32B 7/14; B32B 29/02; B32B 3/26; B32B 5/024; B32B 5/022; B32B 5/26; B32B 2260/046; B32B 2260/021; B32B 2262/02; B32B 2262/14; B32B 2262/0253; B32B 2262/023; B32B 2262/0246; B32B 2262/0223; B32B 2262/0261; B32B 2262/0276; B32B 2262/062; B32B 2262/10; B32B 2255/26; B32B 2255/12; B32B 2307/718; B32B 2307/732; B32B 2307/724; B32B 2307/726; B32B 2250/20; B32B 2250/02; B32B 2239/025; B32B 2239/0654

See application file for complete search history.

(56) References Cited

U.S. PATENT DOCUMENTS

| | | |
|---|---|---|
| 7,927,540 B2 | 4/2011 | Smithies et al. |
| 7,981,509 B2 | 7/2011 | Kalayci |
| 8,029,588 B2 | 10/2011 | Chung et al. |
| 8,118,901 B2 | 2/2012 | Chung et al. |
| 8,177,876 B2 | 5/2012 | Kalayci et al. |
| 8,247,069 B2 | 8/2012 | Kalayci |
| 8,360,251 B2 | 1/2013 | Wieczorek et al. |
| 8,366,797 B2 | 2/2013 | Chung et al. |
| 8,512,431 B2 | 8/2013 | Chung et al. |
| 8,517,185 B2 | 8/2013 | Wieczorek et al. |
| 8,584,871 B2 | 11/2013 | Storer et al. |
| 8,590,712 B2 | 11/2013 | Wieczorek et al. |
| 8,608,817 B2 | 12/2013 | Freeman et al. |
| 8,678,202 B2 | 3/2014 | Wieczorek et al. |
| 8,709,118 B2 | 4/2014 | Chung et al. |
| 8,986,432 B2 | 3/2015 | Wertz et al. |
| 9,199,185 B2 | 12/2015 | Verdegan et al. |
| 9,220,998 B2 | 12/2015 | Seo et al. |
| 9,623,352 B2 * | 4/2017 | Kas .................. B01D 39/14 |
| 2008/0264259 A1 | 10/2008 | Leung |
| 2009/0160099 A1 | 6/2009 | Huang |
| 2010/0000411 A1 | 1/2010 | Wertz et al. |
| 2010/0282682 A1 * | 11/2010 | Eaton ............. B01D 39/1623 |
| | | 210/650 |
| 2011/0016862 A1 | 1/2011 | Song et al. |
| 2012/0292252 A1 | 11/2012 | Chase et al. |
| 2013/0112625 A1 | 5/2013 | Bahukudumbi et al. |
| 2013/0115837 A1 | 5/2013 | Kitchen et al. |
| 2013/0118973 A1 | 5/2013 | Seo et al. |
| 2014/0110354 A1 | 4/2014 | Haberkamp et al. |

FOREIGN PATENT DOCUMENTS

| | | |
|---|---|---|
| WO | WO-01/52995 | 7/2001 |
| WO | WO-2011/162854 | 12/2011 |
| WO | WO-2011/162855 | 12/2011 |
| WO | WO-2015/017795 | 2/2015 |

OTHER PUBLICATIONS

First Office Action issued for Chinese Patent Application No. CN 201780023203.4, dated Jun. 17, 2020, 9 pages, and English language translation, 13 pages.

\* cited by examiner

NANOFIBER FILTER MEDIA FOR HIGH PERFORMANCE APPLICATIONS

CROSS REFERENCE TO RELATED APPLICATIONS

The present application is a National Stage of PCT Application No. PCT/US2017/028157, filed Apr. 18, 2017, which claims the benefit of priority to U.S. Provisional Patent Application No. 62/324,179, filed Apr. 18, 2016. The contents of both applications are incorporated herein by reference in their entirety.

TECHNICAL FIELD

The present application relates to filter media used in filtration systems for use with internal combustion engines or the like.

BACKGROUND

In the area of filtration systems for use with internal combustion engines, there is an increasing need for filters that provide high particulate removal, low restriction, and long life in the field. This is most evident for engine air and diesel fuel filtration. To meet these competing requirements, improvements in filter design and filter media are required. Specifically, it is desirable to maximize the amount of media surface area that can be packaged in a defined filter volume while minimizing costs. This can be accomplished by making the media thinner and/or by texturing the upstream face of the media. Both approaches increase the relative amount of media surface area available for contaminant removal that can be packaged in a given volume. The challenge with thin media, however, is that it relies on surface filtration, which does not provide optimal dust holding capacity and filter life.

SUMMARY

A new type of filter media can overcome these conflicting design constraints and challenges, while still meeting customer requirements of high particulate removal, low restriction and long life in the field. Accordingly, a first set of embodiments relate to a composite filter media, comprising at least one nanofiber layer bonded to a substrate layer, the at least one nanofiber layer comprising a plurality of nanofibers having a geometric mean diameter of less than or equal to 0.5 µm, the at least one nanofiber layer having a thickness of about 1-100 µm.

In some embodiments, the plurality of nanofibers have a geometric standard deviation of nanofiber diameter of greater than 1.4. In some embodiments, the plurality of nanofibers have a geometric mean diameter of 0.1-0.5 µm and a geometric standard deviation of nanofiber diameter of 1.5-2.0. In some embodiments, the at least one nanofiber layer has a thickness in the range of 1-50 µm. In some embodiments, the plurality of nanofibers have a nanofiber basis weight in the range of 0.7 g/m$^2$ to 3 g/m$^2$. In some embodiments, the plurality of nanofibers have a nanofiber basis weight in the range of 3 g/m$^2$ to 10 g/m$^2$.

In some embodiments, the at least one nanofiber layer further comprises polymeric masses having an area equivalent diameter of larger than 1 µm and covering 1-25% of media surface area. In some embodiments, the polymeric masses cover 2-5% of the media surface area. In some embodiments, the polymeric masses are incorporated within the nanofiber layer. In some embodiments, the polymeric masses are located at an interface between the at least one nanofiber layer and the substrate layer to help secure the at least one nanofiber layer to the substrate layer. In some embodiments, the polymeric masses provide anchor points for the plurality of nanofibers and create a three dimensional surface to the at least one nanofiber layer. In some embodiments, the polymeric masses are made of the same polymer as the plurality of nanofibers. In some embodiments, the polymeric masses have a diameter at least the thickness of the at least one nanofiber layer and provide anchor points for the plurality of nanofibers. In some embodiments, the polymeric masses have area equivalent diameters in the range of 5 µm to 130 µm.

In some embodiments, the substrate layer comprises coarse fibers having a geometric mean fiber diameter of larger than 1 µm. In some embodiments, the coarse fibers comprise at least one of cellulose, polyester, and polyamide. In some embodiments, the at least one nanofiber layer is upstream of the substrate layer, and wherein the composite filter media is free of an additional layer upstream of the at least one nanofiber layer. In some embodiments, the composite filter media is a hybrid surface-depth filter. In some embodiments, a thickness of the hybrid surface-depth filter is in the range of 4 µm to 25 µm. In some embodiments, a thickness of the hybrid surface-depth filter is in the range of 1 µm to 5 µm.

Another set of embodiments relates to a composite filter media, comprising at least one nanofiber layer bonded to a substrate layer, the at least one nanofiber layer comprising a plurality of nanofibers having a geometric mean diameter of less than or equal to 0.5 µm and a plurality of polymeric masses having area equivalent diameter in the range of between 5 µm to 130 µm.

In some embodiments, the plurality of nanofibers have a geometric standard deviation of nanofiber diameter of greater than 1.4. In some embodiments, the plurality of nanofibers have a geometric mean diameter of 0.1-0.5 µm and the plurality of polymeric masses have an area equivalent diameter in the range of between 40 vim to 100 µm. In some embodiments, the at least one nanofiber layer has a thickness in the range of 1-50 µm. In some embodiments, the plurality of nanofibers have a nanofiber basis weight in the range of 0.7 g/m$^2$ to 3 g/m$^2$. In some embodiments, the plurality of nanofibers have a nanofiber basis weight in the range of 3 g/m$^2$ to 10 g/m$^2$. In some embodiments, the plurality of polymeric masses covers 1-25% of media surface area. In some embodiments, the plurality of polymeric masses covers 2-5% of the media surface area. In some embodiments, the plurality of polymeric masses are incorporated within the at least one nanofiber layer. In some embodiments, the plurality of polymeric masses are located at an interface between the at least one nanofiber layer and the substrate layer to help secure the at least one nanofiber layer to the substrate layer. In some embodiments, the plurality of polymeric masses provide anchor points for the plurality of nanofibers and create a three dimensional surface to the at least one nanofiber layer.

In some embodiments, the plurality of polymeric masses have a diameter at least the thickness of the at least one nanofiber layer and provide anchor points for the plurality of nanofibers. In some embodiments, the plurality of polymeric masses are made of the same polymer as the plurality of nanofibers. In some embodiments, the substrate layer comprises coarse fibers having a geometric mean fiber diameter of larger than 1 µm. In some embodiments, the coarse fibers comprise at least one of cellulose, polyester, and polyamide. In some embodiments, the at least one nanofiber layer is upstream of the substrate layer, and wherein the composite filter media is free of an additional layer upstream of the at least one nanofiber layer. In some embodiments, the composite filter media is a hybrid surface-depth filter. In some embodiments, a thickness of the hybrid surface-depth filter is in the range of 4 μm to 25 μm. In some embodiments, a thickness of the hybrid surface-depth filter is in the range of 1 μm to 5 μm.

Another set of embodiments relates to a composite filter media, comprising at least one nanofiber layer bonded to a substrate layer, wherein the at least one nanofiber layer comprises a plurality of nanofibers having a nanofiber basis weight in the range of 0.7 g/m$^2$ to 10 g/m$^2$, wherein the thickness of the at least one nanofiber layer is in the range of 1-100 μm, and wherein a linear relationship exists between the thickness of the at least one nanofiber layer as a function of the nanofiber basis weight.

In some embodiments, the linear relationship between the thickness of the at least one nanofiber layer as a function of the nanofiber basis weight is described as y=5.6221x−3.092, where x=the nanofiber basis weight in g/m$^2$ and y=the thickness of the at least one nanofiber layer in μm.

Another set of embodiments relates to a method for removing particulates from air, comprising passing air through the composite filter media of the present disclosure in an air flow direction such that the nanofiber layer is upstream of the substrate layer.

Another set of embodiments relates to a method for removing particulates from a liquid, comprising passing the liquid through the composite filter media of the present disclosure.

These and other features, together with the organization and manner of operation thereof, will become apparent from the following detailed description when taken in conjunction with the accompanying drawings.

DETAILED DESCRIPTION

Figure 1:
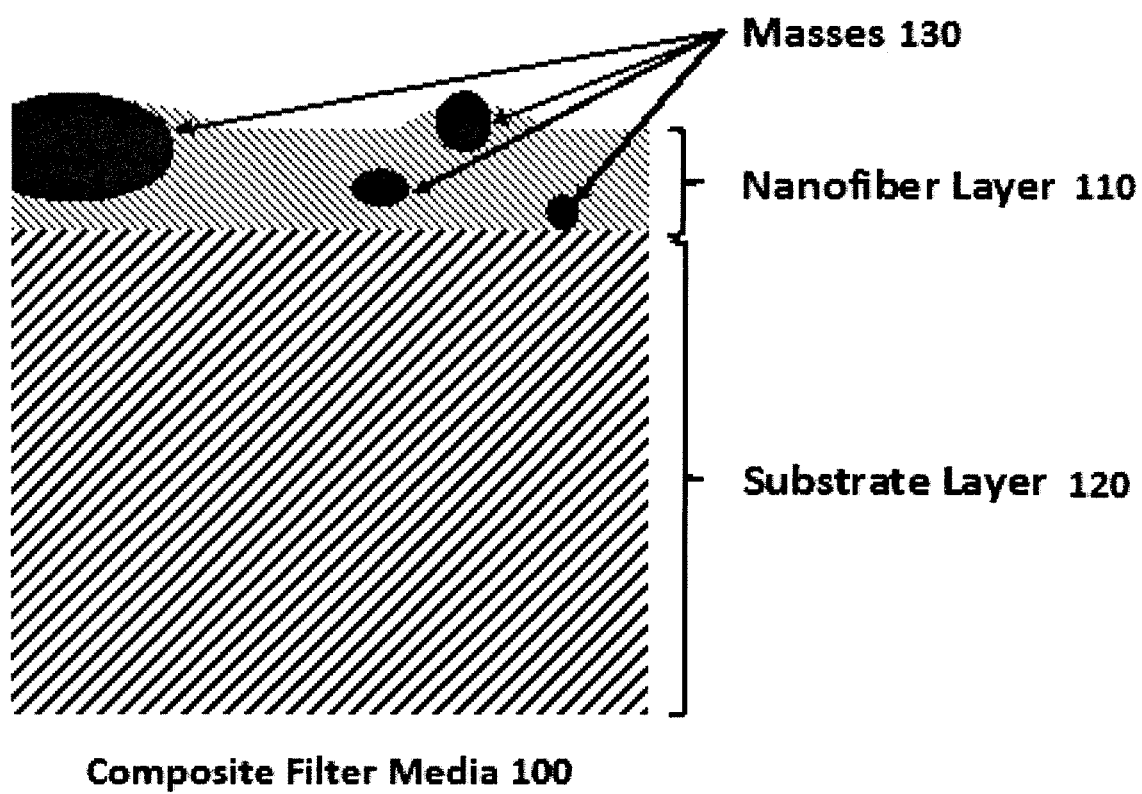
FIG. 1 shows a schematic illustration of a nanofiber composite filter media.

Reference will now be made in detail to some specific embodiments of the invention contemplated by the inventors for carrying out the invention. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

In the following description, numerous specific details are set forth in order to provide a thorough understanding of the present invention. Particular example embodiments of the present invention may be implemented without some or all of these specific details. In other instances, well known process operations have not been described in detail in order not to unnecessarily obscure the present invention.

Various techniques and mechanisms of the present invention will sometimes be described in singular form for clarity. However, it should be noted that some embodiments include multiple iterations of a technique or multiple instantiations of a mechanism unless noted otherwise.

In the present disclosure, a composite filter media is fabricated with a relatively thin (and/or low basis weight) layer of nanofibers having a large geometric standard deviation for filter diameter and whose structure is optionally supported by large polymeric masses. Conventional nanofibers used for air filtration have a very thin and low basis weight nanofiber that is essentially flattened, with narrow geometric standard deviation and few, if any, polymeric masses.

The media disclosed herein may also be used for liquid (e.g., fuel) filtration and has a large geometric standard deviation for filter diameter and three dimensional structure supported by large polymeric masses, but may be thicker than the nanofiber layer used in air filtration in order to meet removal and filter life (i.e. capacity) requirements of customers.

The development of improved nanofiber composites for air and liquid filtration processes was driven by a need to obtain higher performance at the lowest possible cost.

The term "nanofiber" has been used to refer to fibers smaller than or equal to 0.5 μm. This definition reflects the diameter of fibers produced by electrospinning, electroblowing, meltblowing, and related methods of producing "nanofiber." It is generally understood that contaminant removal efficiency and pressure drop both increase as fiber diameter decreases. This is an undesirable tradeoff of removal for pressure. When nanofibers are used, however, efficiency is higher and pressure drop is lower than expected, i.e., the tradeoff between efficiency and pressure drop is more favorable.

Air Filtration

In air filtration, when the Knudsen Number (i.e. the ratio of the gas mean free path to the radius of the fiber) exceeds 0.1, slip flow starts to occur. This results in reduced pressure drop relative to continuous flow conditions and increased particle removal efficiency is observed. The Knudsen Number can be used to functionally define nanofiber in terms of a diameter. Since the gas mean free path is about 0.066 nm, slip flow and its corresponding benefits for filtration begin to occur at fiber diameters smaller than about 1.3 µm, and the resultant benefits become increasingly important as the geometric mean fiber diameter approaches 0.5 µm or smaller. Thus, clear benefits are observed for media with geometric mean fiber diameter smaller than about 0.5 µm.
Composite Filter Media.

Figure 14:
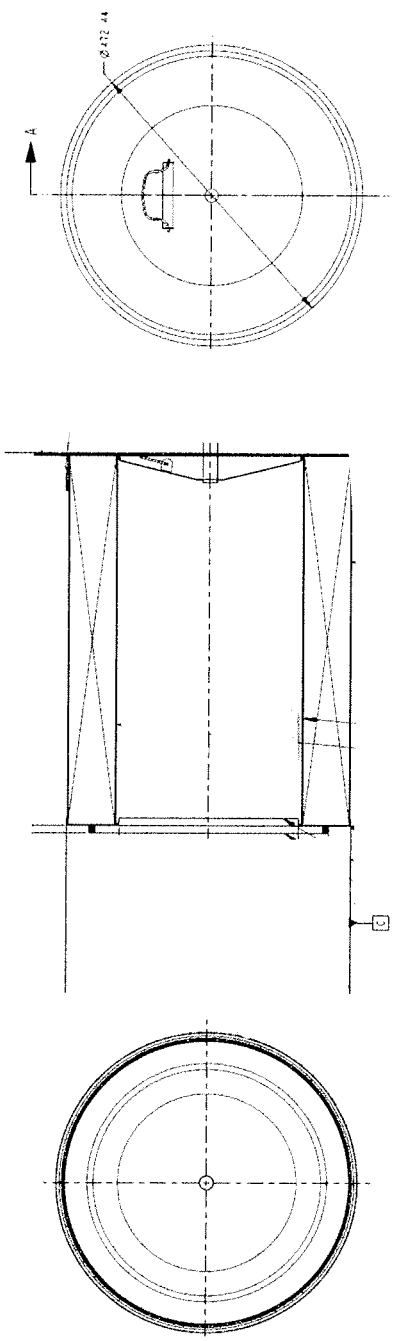
FIG. 14 shows an exemplary cylindrical air filter element that may comprise filter media of the present disclosure.
Figure 15:
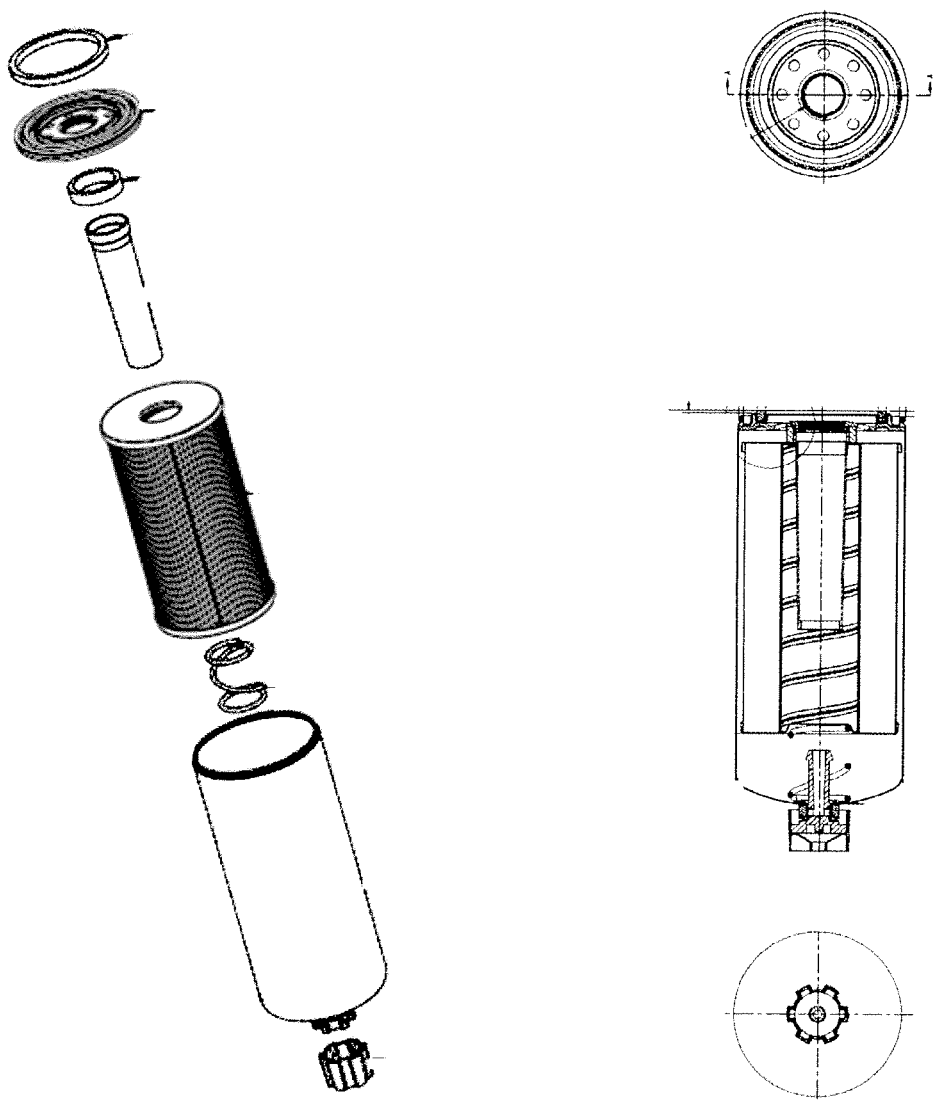
FIG. 15 shows an exemplary spin-on fuel filter element that mail comprise filter media of the present disclosure.

Various embodiments described herein relate to a composite filter media (utilized in, for example, the example cylindrical air filter element of FIG. 14 or the exemplary spin-on fuel filter element of FIG. 15) comprising at least a nanofiber layer and a substrate layer. The nanofiber layer is between about 1 and about 100 microns thick and is composed of polymeric nanofibers with geometric mean diameter ≤0.5 micron and may have a geometric standard deviation diameter >1.4. The substrate layer is composed of fibers with a geometric mean diameter greater than 1 micron. Moreover, the nanofiber layer may optionally comprise larger masses with area equivalent diameters similar to or greater than the thickness of the nominal nanofiber layer, interspersed within the structure of the nanofiber layer and covering 2 to 25% of the visible surface area of the media. If additional layers are positioned on top of the nanofiber layer (i.e. a microfiber layer), the masses may no longer be visible unless the additional layers are reassigned. Furthermore, the masses may be polymeric and made of the same polymer as the nanofibers, may be incorporated in the structure of the nanofiber layer during nanofiber layer production, and may provide anchor points for the nanofibers.

In some embodiments, a composite filter media, shown generally at 100 in FIG. 1, is provided with at least two layers of different types of filter media a nanofiber layer 110 and a substrate layer 120. The nanofiber layer 110 serves as the filtration layer and strongly influences particulate removal, pressure drop, dust-holding capacity, and life.

The substrate layer 120 supports the nanofiber layer, provides structural integrity and formability, and may also effect particulate removal, pressure drop, dust-holding capacity, and/or life. Typically, the nanofiber layer 110 is located upstream of the substrate layer 120, although in some embodiments the nanofiber layer 110 may be located downstream of the substrate layer 120. The composite filter media 100 is schematically illustrated in FIG. 1, which shows the nanofiber layer 110, the substrate layer 120, and optional polymeric masses 130 in the nanofiber layer 110. For simplicity, individual fibers are not illustrated. The nanofiber layer 110 comprises or consists of polymeric nanofibers with the optional polymeric masses 130 interspersed throughout. As shown, the polymeric masses 130 may extend or protrude upwards from the nominal surface of the nanofiber layer 110. The polymeric masses 130 provide elevated anchoring and attachment points for nanofibers, allowing them to extend locally at an upward incline with respect to the nominal nanofiber layer surface, and thus providing textured surfaces, increased media surface area, and variable depths of the nanofiber layers 110. When polymeric masses 130 are located at the interface between the nanofiber layer 110 and substrate layer 120, they may also help attach and secure the nanofiber layer 110 to the substrate layer 120.

In some embodiments, the composite media comprises a nanofiber layer with broad fiber size distribution bonded to a substrate. The nanofiber layer comprises polymeric fibers with geometric mean diameter less than or equal to 0.5 µm (e.g., 0.1-0.4 µm), (in some embodiments) geometric standard deviation greater than 1.4, nanofiber layer thickness between between about 1 and about 50 µm, and optionally polymeric masses with diameters larger than 1 µm (e.g., 1-100 µm) covering 1 to 25% of the media face.
Nanofiber Layer Tables 1A and 1B summarize characteristics of the nanofiber layer of composite filter media according to various embodiments (1A, Improved Nanofiber Composite Media) and more conventional filter media (1B, Prior Art Nanofiber Composite Media). FIGS. 2, 3, 4, 5, and 6 show SEM photomicrographs of various embodiments of the present invention, as well as conventional media, at different magnifications and from different perspectives.

Throughout, Media A, B, C, and D are examples of the various embodiments described herein. More specifically, Media A, B, C, and D are developmental media demonstrating various examples and embodiments of the improved nanofiber composite media. Media E, F, and G are representative examples of conventional nanofiber composite media for air applications. More specifically, Media E, F, and G are examples of the thinner conventional nanofiber composite media that have been or are available on the market.

Media A, B, C, D, E, F, and G are related filter media, which may be used for engine air filter applications that possess a nanofiber layer that is supported by a cellulose substrate with no additional layers of media upstream of the nanofiber layer. The substrate layers of the media are similar, but not necessarily identical. The minimum specification for gravimetric efficiency for the substrate layer alone for Media A, B, C, D, and E is 99.9%, recognizing that there is variability among lots of filter media. The substrate layers of Media A, C and E and their performance are nearly identical, hence any observed difference in performance can be attributed to the nanofiber layer. For improved nanofiber composite media, the presence of an upstream layer is optional. Media E, F, and G lack the loft or thickness of the improved nanofiber composite media. This lack of thickness is characteristic of conventional nanofiber composite media used for air filtration, which rely on surface filtration to initiate formation of a dust cake.

The substrate layer, which supports the nanofiber layer, provides strength and facilitates processing during pleating and production of filter element, may be a cellulose, but other more open (mean flow pore size and/or Frasier permeability greater than the nanofiber layer) porous layer may be used. For air filtration applications, it is beneficial that the substrate possess a Frasier permeability of less than 150 cfm. Performance of the nanofiber composite media when the substrate Frasier permeability is greater than these values deteriorates, i.e., removal may be reduced, the media may develop leaks, or it may be difficult to process.

Figure 2:
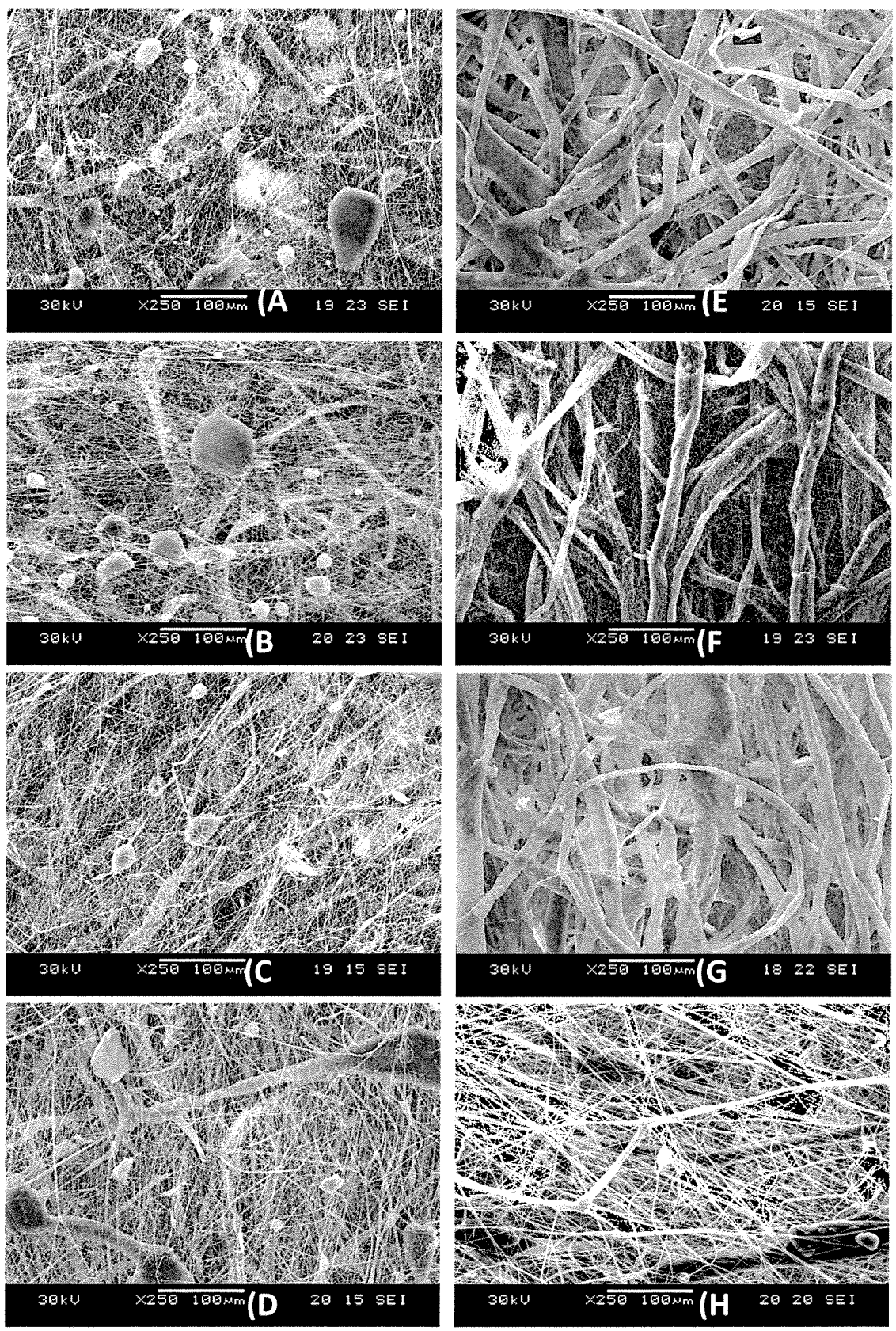
FIG. 2 shows SEM photomicrographs at 250× of representative nanofiber filter media. (A) Media A, (B) Media B, (C) Media C, (D) Media D, (E) Media E, (F) Media F, (G) Media G, (H) Media H.
Figure 3:
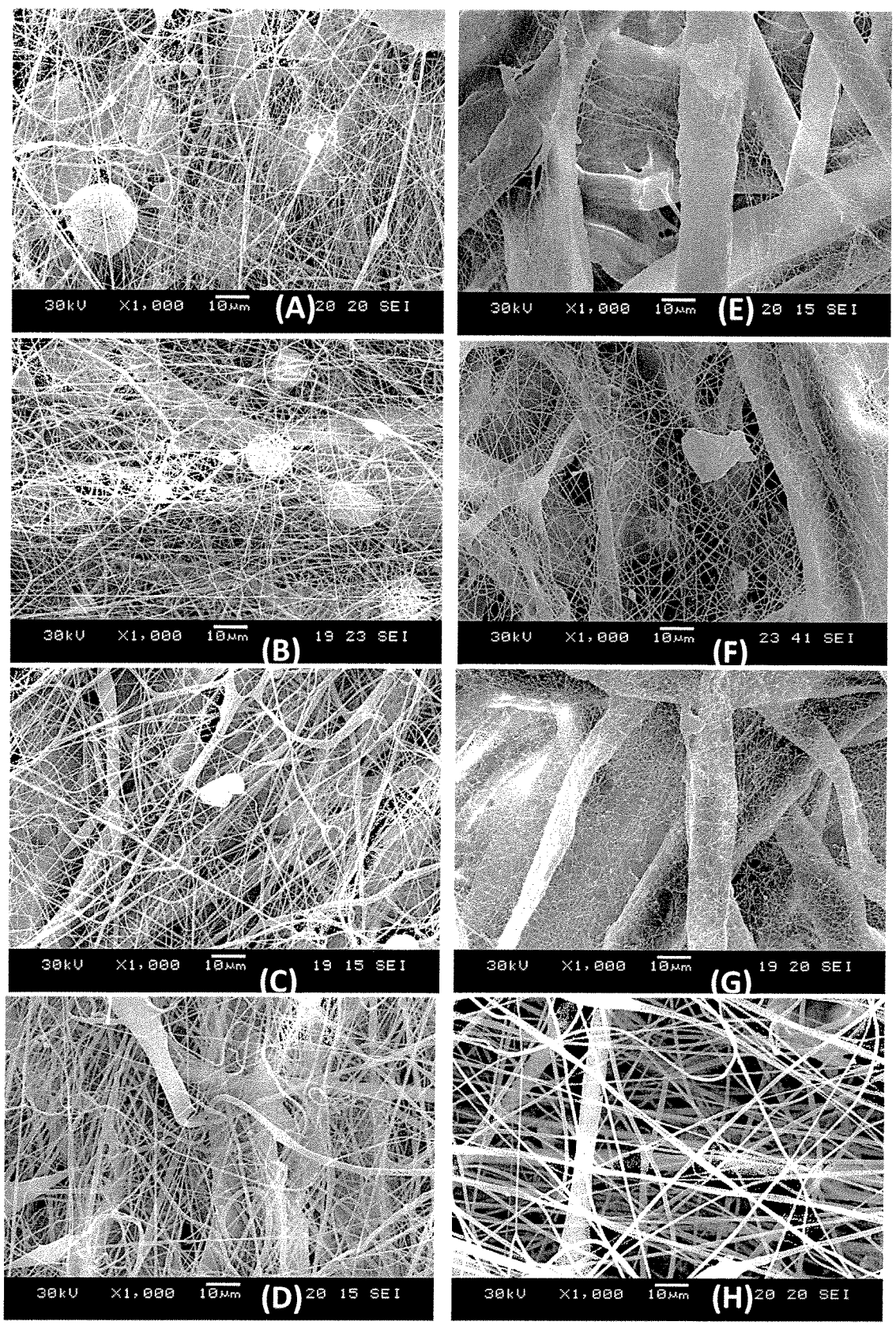
FIG. 3 shows SEM photomicrographs at 1000× of representative nanofiber filter media. (A) Media A, (B) Media B, (C) Media C, (D) Media D, (E) Media E, (F) Media F, (G) Media G, (H) Media H.
Figure 4:
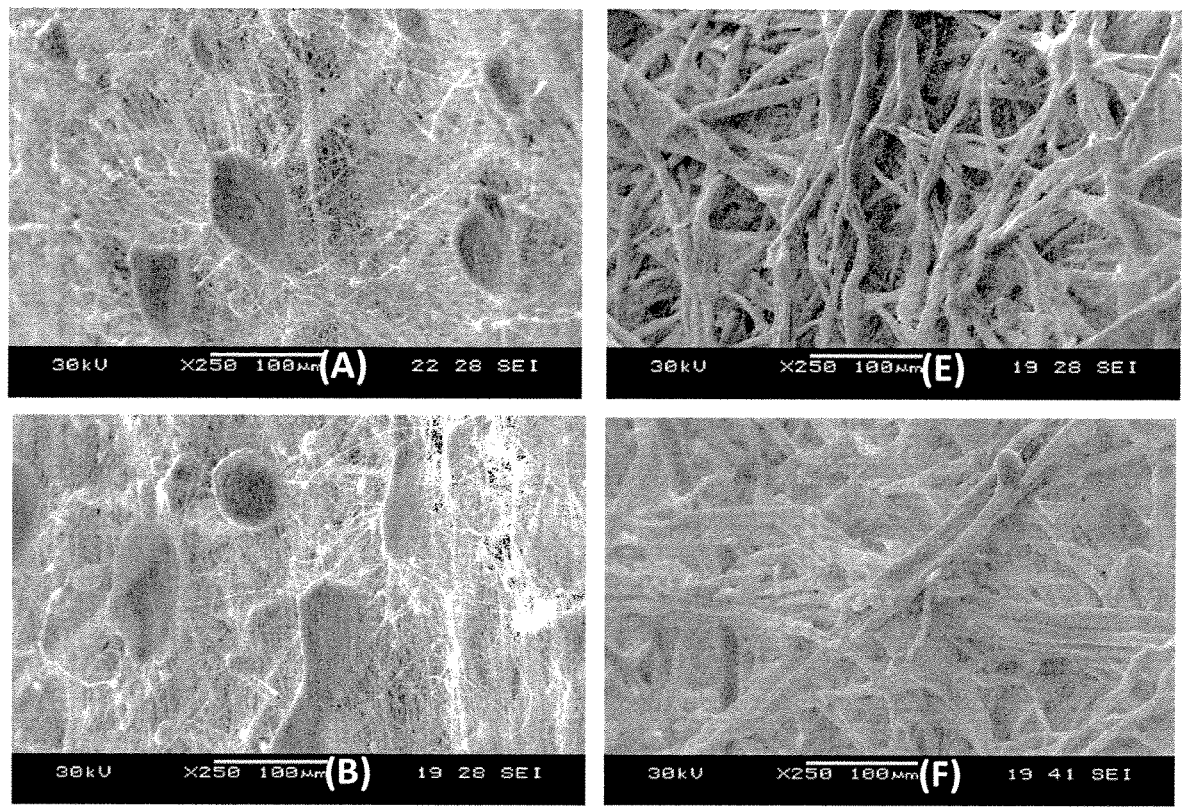
FIG. 4 shows SEM photomicrographs at 250× of Media A, B, E and F as viewed from a 45° angle.
Figure 5:
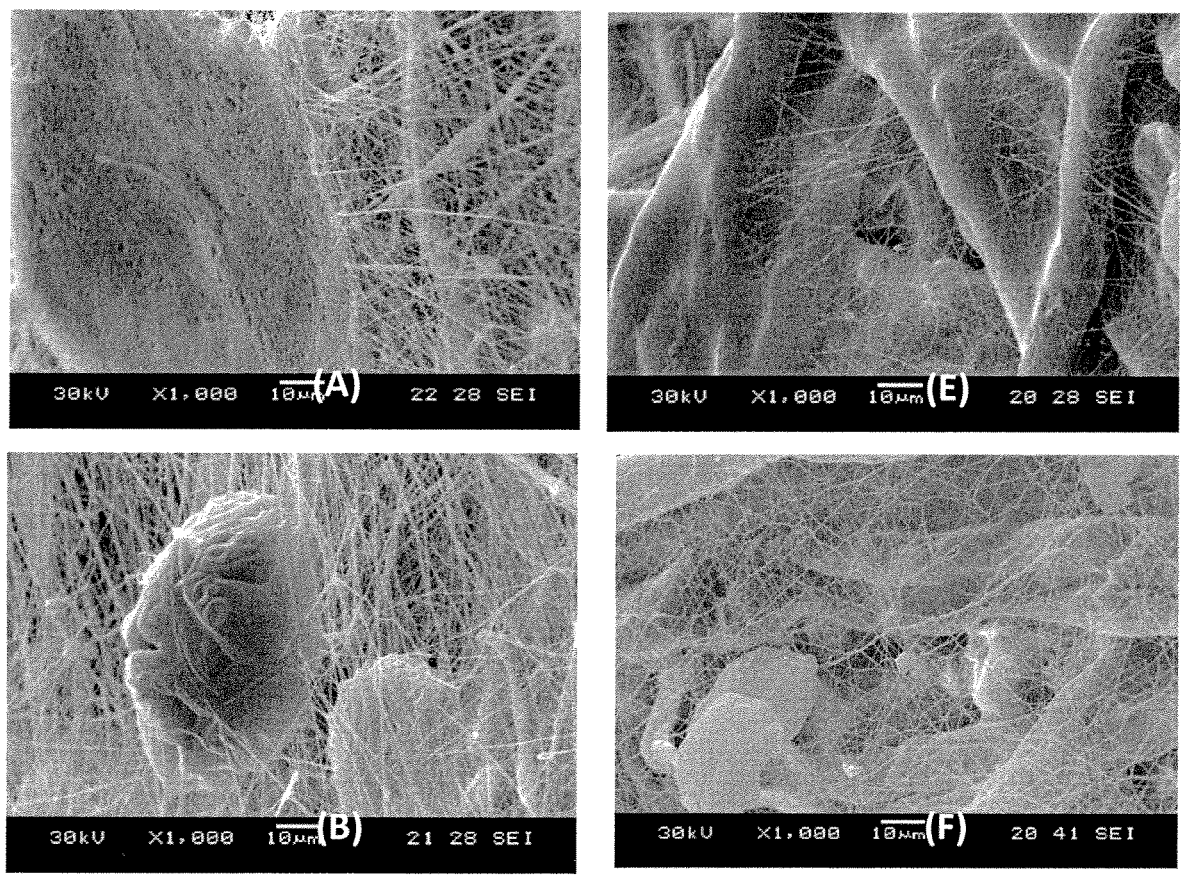
FIG. 5 shows SEM photomicrographs at 1000× of Media A, B, E and F as viewed from a 45° angle.
Figure 6:
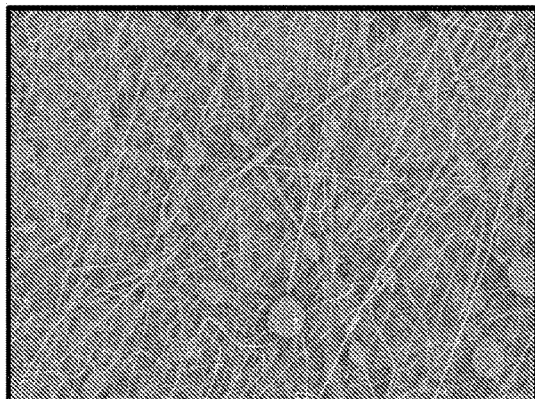
FIG. 6 shows SEM photomicrographs at 250× and 1000× of Media I, J, and K.
Figure 6:
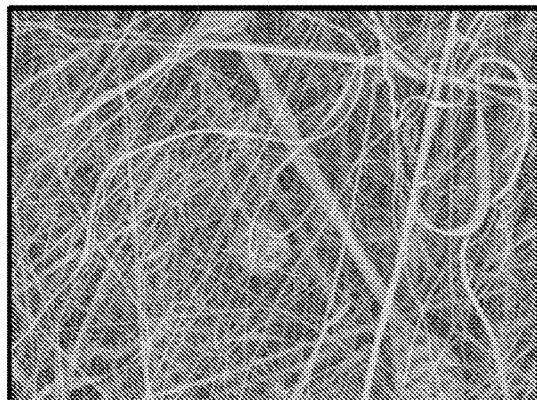
Figure 6:
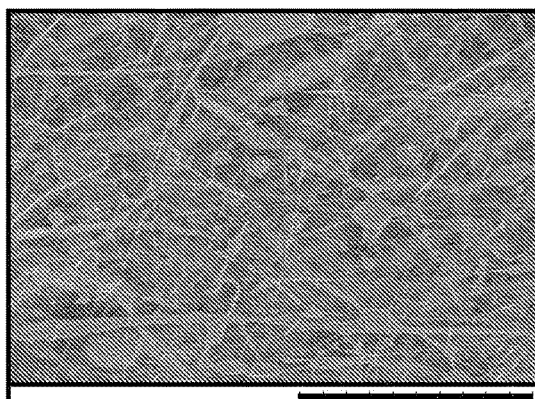
Figure 6:
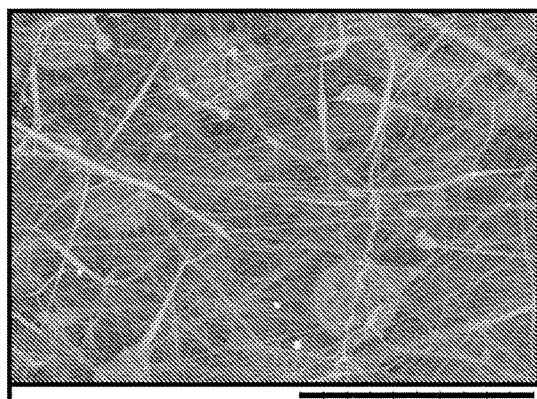
Figure 6:
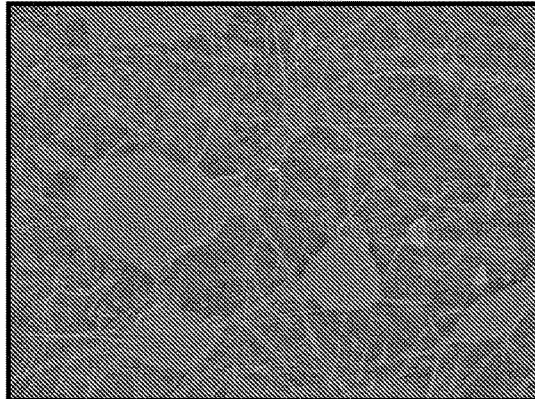
Figure 6:
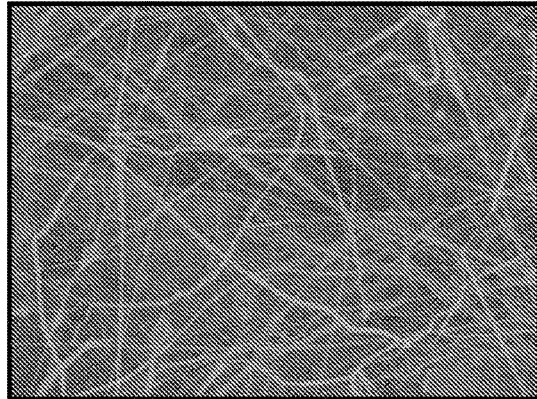

FIGS. 2 and 3 show SEM photomicrographs of the media at 250× and 1000×, respectively, viewed from the top (nanofiber layer side). FIGS. 4 and 5 show SEM photomicrographs of Media A, B, E and F at 250× and 1000×, respectively, as viewed from the side at a 45° angle.

TABLE 1A

| Property | Units | A Dev.* | B Dev.* | C Dev.* | D Dev.* | J Dev.* | L Dev* |
|---|---|---|---|---|---|---|---|
| | | \multicolumn{6}{c}{Improved Nanofiber Composite Media} |
| Geometric mean fiber diameter | μm | 0.19 | 0.19 | 0.28 | 0.33 | 0.231 | 0.22 |
| Geometric standard deviation nanofiber diameter | | 1.7 | 1.68 | 1.5 | 1.45 | 1.303 | 1.39 |
| Nanofiber basis weight | g/m² | 0.9 | 0.9 | 1 | 2 | 3 | 5 |
| Thickness of nanofiber layer | μm | 2.9 | 2.5 | 2.1 | 2.7 | 8.7 | 21 |
| Largest observed diameter of polymeric mass | μm | 77 | 76 | 37 | 126 | 137 | 128 |
| Media surface area coverage by polymeric masses | % | 10.2% | 8.7% | 2.5% | 16.7% | 7.5% | 6.6% |

*Dev. refers to developmental filter media

TABLE 1B

| Property | Units | E Cummins Filtration NanoForce® pre-2017 | F Donaldson Ultra-Web® | G Baldwin ProTura® | H Cummins Filtration NanoNet® 5 micron | I Donaldson Ultra-Web® HD | K Cummins Filtration NanoNet® 2 micron |
|---|---|---|---|---|---|---|---|
| | | \multicolumn{6}{c}{Prior Art Nanofiber Composite Media} |
| Geometric mean fiber diameter | μm | 0.09 | 0.14 | 0.05 | 0.64 | 0.13 | 0.31 |
| Geometric standard deviation nanofiber diameter | | 1.39 | 1.33 | 1.38 | 1.49 | 1.57 | 1.47 |
| Nanofiber basis weight | g/m² | <0.1 | <0.1 | <0.1 | 30 | 0.13 | 20 |
| Thickness of nanofiber layer | μm | 0.45 | 0.32 | 0.41 | 160 | 0.69 | 120 |
| Largest observed diameter of polymeric mass | μm | 20 | 31 | 13 | 77 | 8 | 193 |
| Media surface area coverage by polymeric masses | % | <1% | 1.9% | <1% | 3.7% | <1% | 5.5% |

*Dev. refers to developmental filter media

Figure 7:
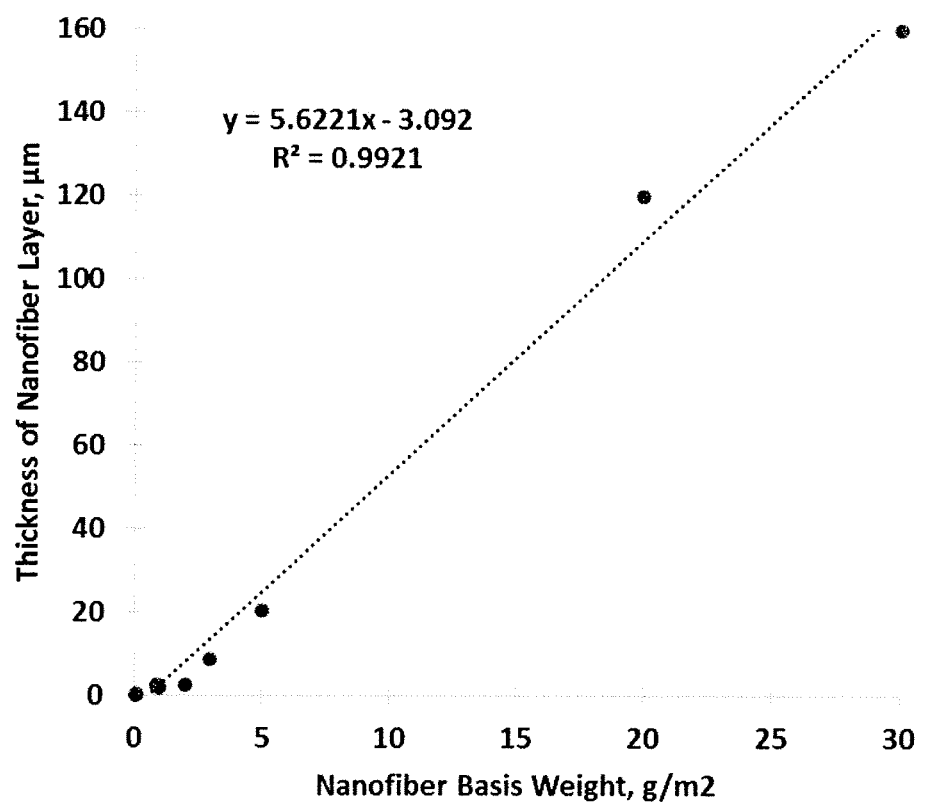
FIG. 7 shows nanofiber layer thicknesses plotted as a function of nanofiber basis weight for Media A, B, C, D, E, F, G, H, I, J, and K.

The basis weight of the nanofiber layer is provided in Tables 1 A and 1B above. FIG. 7 show nanofiber layer thicknesses plotted as a function of nanofiber basis weight for Media A, B, C, D, E, F, G, H, I, J, K, and L. An almost linear relationship is observed between basis weight and thickness; thus, nanofiber layer basis weight may be used as a surrogate for nanofiber layer thickness and, in some embodiments, is more convenient to measure. The basis weight of the nanofiber layer may be determined by several methods. For example, if the nanofiber layer is formed as a separate sheet, its basis weight may be determined using TAPPI T410 om-13, "Grammage of paper and paperboard (weight per unit area)." Another method is to use an SEM to determine the portion of the of the media face area covered by nanofibers and to determine their diameters. This information in conjunction with a knowledge of the density of the nanofiber polymer can be used to determine the basis weight of the nanofiber layer. Other methods may be used as well. Media E, F, and G all exhibit nanofiber layer thickness less than 1 μm and nanofiber basis weight less than 0.9 g/m², while Media A, B, C, D, H, I, J, K, and L all exhibit nanofiber layer thickness greater than or equal to 1 μm and nanofiber basis weight greater than 0.7 g/m², and, more particularly, greater or equal to than 0.9 g/m².

Referring to FIG. 1, the nanofiber layer 110 is attached to the substrate layer 120, typically to its upstream face with respect to the fluid flow, and comprises at least one type of polymeric fiber (e.g., nylon 6). Other polymers for the nanofiber layer include polyacrylonitrate (PAN), polycaprolactone, polyvinylpyrrolidone (PVP), polyethyleneoxide (PEO), polyvinylalcohol (PVA), polyolefin, polyacetal, polyamide, polyester, cellulose ether and ester, polyalkylene sulfide, polyarylene oxide, polysulfone, modified polysulfone polymers, polyethylene, polypropylene, poly(vinylchloride), polymethylmethacrylate (and other acrylic resins), polystyrene, poly(vinylidene fluoride), poly(vinylidene chloride), polyvinylalcohol, long chain synthetic polyamides, hexafluoropropylene, polyvinyl acetate, polyvinyl acetate, copolymers thereof, and mixtures thereof. Referring to Tables 1A and 1B, the geometric mean nanofiber diameter of the nanofiber layer is less than 1 μm. For the improved nanofiber composite media, the geometric mean nanofiber diameter of the nanofiber layer is ideally between 0.05 and 0.5 μm, and preferably between 0.1 and 0.5 μm inclusive. In contrast to conventional nanofibers, the nanofiber diameter distribution may be broad, as evident from its geometric standard deviation. The geometric fiber diameter standard deviation is greater than 1.4, and more preferably between 1.5 and 2.0 in particular embodiments. Conventional surface filtration nanofiber media, such as used in air filtration, exhibit narrower nanofiber diameter distributions, with geometric standard deviations less than 1.4. In order to maximize removal and minimize pressure drop, conventional media strive to reduce the relative number of coarse fibers and narrow their diameter distribution. The narrower diameter distribution of conventional media may be in part a byproduct of the electrospinning process used to produce the nanofiber. This process is described, for example, in U.S. Pat. No. 9,220,998, the contents of which are incorporated herein by reference. In various embodiments described herein, depth filtration rather than surface filtration is used to mitigate these adverse trade-offs while improving the dust-holding capacity and life of the filter, hence a broader diameter distribution is needed. The nanofiber with such characteristics as required by the various embodiments described herein may be produced in a variety of ways, e.g., meltblowing or electroblowing. Meltblowing is described, for example, in U.S. Pat. No. 8,986,432, the contents of which are incorporated herein by reference. Electroblowing is described, for example, in U.S. Pat. No. 7,927,540, the contents of which are incorporated herein by reference.

In contrast to conventional nanofiber air filtration media, the filter media of the various embodiments described herein utilize depth filtration and behave less like a strainer or sieve. Referring to Tables 1A and 1B, the nanofiber layer of the various embodiments described herein is between about 1 and about 100 µm thick, inclusive, and ideally between about 1 and about 50 µm thick, preferably between about 2 and about 30 µm in thickness. The thickness of a nanofiber layer in composite filter media may be determined in a number of ways, such as by means of viewing a cross-section of the media with a scanning electron microscope (SEM) or by measuring the thickness of the nanofiber prior to attachment to the substrate layer according to TAPPI T 411 (Technical Association of the Pulp and Paper Industry Standard T 411 om-97 Thickness (caliper) of Paper, Paperboard, and Combined Board). The TAPPI method, however, may be inappropriate and underestimates nanofiber layer thickness as a pressure of 50 kPa is applied when making the measurement. For thin nanofiber layers, less than 100 µm thick, the aforementioned methods may be difficult, and thus nanofiber thickness may be estimated by using an SEM to view the top surface of the nanofiber layer, such as shown in FIG. 3, and measuring and summing the fiber diameters of each nanofiber going from the top of the nanofiber layer and continuing to the top surface of the substrate layer. This process can be repeated multiple times at different location on the media to obtain an average thickness. Alternatively, a sample of the filter media may be embedded in epoxy. Cyanoacrylate adhesive or other low viscosity wetting agent may be used to assist in fully encapsulating the nanofiber media. The embedded media can then be cut, polished and viewed in cross section by SEM to determine the nanofiber layer thickness. Alternatively, the thickness of the nanofiber layer can be estimated from the nanofiber basis weight using the equation given in FIG. 7. In areas of the filter media lacking polymeric masses, the nanofiber layer of the various embodiments described herein is typically between about 1 and about 50 µm thick, inclusive, and ideally between about 1 and about 15 µm thick, preferably between about 2 and about 5 µm in thickness. At locations near the polymeric masses, the thickness may approach about 100 µm. This is sufficiently thick for depth filtration, yet thin enough to maximize the amount of media surface area that can be packaged in a defined filter volume to further increase filter life.

Increasing the thickness of the nanofiber layer alone may not result in depth filtration. The combination of thickness with the broad nanofiber diameter distribution results in a lofty, porous fiber structure whose entire depth is utilized in contaminant removal. In contrast, conventional air filtration media, with its narrow nanofiber diameter distribution, and thickness ranging from about 0.05 to about 0.2 µm, relies on surface filtration to remove contaminant. The thickness of the nanofiber layer in this invention, in contrast to prior art media, is on the same order as the size of the contaminant being removed, i.e., 1 to 100 microns, more specifically 1 to 50 microns, and even more specifically 1 to 15 microns. It is counterintuitive that a nanofiber layer with thickness approximately equal to the particle size of contaminants could function as a hybrid surface-depth type filter with the accompanying benefits of both.

Polymeric Masses

In order to further enhance the performance of the filter media, the nanofiber layer optionally contains polymeric masses formed from clumps of nanofiber and polymer beads. This is shown schematically in FIG. 1 and in the SEM images of FIG. 2 (Media A, B, C and D), FIG. 3 (Media A, B, C and D), FIG. 4 (Media A and B), FIG. 5 (Media A and B) and FIG. 6 (Media I, J and K). These masses are formed with the nanofiber layer during its production and may appear as snarls or clumps along a nanofiber and in the media. These masses provide anchor points for nanofibers in the nanofiber layer and to the substrate. As such, they can strengthen the media, provide additional loft to the nanofiber layer facilitating depth filtration, provide texture to the surface increasing media surface area, and yield localized areas of greater depth than the surrounding media. These masses produce a three-dimensional surface to the nanofiber layer face with peaks and valleys that effectively increases the surface area of the media at a microscale, as shown in FIGS. 4 and 5. Referring to FIGS. 4 and 5, it is noteworthy that for conventional Media E, the coarse substrate fibers actually project through the very thin nanofibers, while Media A and B of the various embodiments described herein exhibit polymeric masses anchoring nanofibers projecting up from the nominal nanofiber surface. These masses may be approximately spherical, spheroid, ellipsoid, oblate ellipsoid, or flattened versions of these, or may be irregular in shape. The area equivalent diameter of these masses is, ideally greater than 1 µm, and preferably greater than 5 µm. It is preferred that the diameter of these masses be greater than or equal to the corresponding depth of the surrounding nanofiber layer where no such polymeric masses are present. Referring to Tables 1A and 1B, the largest of these masses are typically in the 35 to 130 µm area equivalent diameter range, and it is common for these masses to be in the 40 to 100 µm area equivalent diameter range. The largest observed diameter of polymeric mass refers to the area equivalent diameter of the largest polymeric mass that was observed. The sizes of these masses are such that their upstream features may rise up from the surface of the surrounding nanofiber. Nanofibers anchored to these upstream features result in localized areas often thicker than the surrounding nanofiber layers where these masses are absent. The masses also typically extend in a downward direction, towards the substrate. They may contact the substrate and facilitate adhesion of the two layers to one another. It is also noteworthy that while similarly shaped or sized masses may be observed in conventional media such as Media E, F and G, these conventional media masses are few in number and differ from the improved nanofiber composite filter media in that they rest on the surface of the nanofibers. The polymeric masses of various embodiments described herein, on the other hand, are incorporated or produced during nanofiber production and are incorporated within the overall structure of the nanofiber layer. Accordingly, one aspect of the various embodiments described herein relates to a composite filter media with a nanofiber layer with broad fiber diameter distribution and containing polymeric masses with area equivalent diameter similar to or greater than the thickness of the nominal nanofiber layer where such polymeric masses are lacking.

In some embodiments, the total amount of the polymeric masses in the media is controlled. If too abundant, there is insufficient nanofiber to provide the desired particle removal efficiency. The media may even become excessively restrictive. If too few, dust-holding capacity and removal efficiency may suffer. The relative amount of the polymeric masses can be quantified by measuring the percent of media surface area covered by the masses when viewed with an SEM, preferably at a magnification between 50× and 500×, and ideally at a magnification between 100× and 300×. The polymeric masses of the nanofiber layer can cover between 2 and 25% of the visible surface area, and ideally between 2 and 10%, preferably between 5 and 10%.

Substrate Layer

The substrate layer comprises or consists of coarser fiber than the nanofiber layer, with geometric mean fiber diameter larger than 1 μm. Preferably, the geometric fiber diameter of the substrate layer is greater than 5 μm and ideally greater than 10 μm. Typically, the fibers are cellulose, polymeric, glass, or comprise at least one of cellulose, polyester, and polyamide. Substrate fibers may be bonded together using phenolic resin, but acrylic or other resin systems may also be used, or the fibers may be thermally, ultrasonically, or otherwise bonded together. Functionally, the substrate supports the nanofiber layer and allows the composite media to be formed and retain the desired shape during production, transport and use. The nanofiber can be bonded to the substrate or can be applied directly to a substrate as they are formed. Typically, the nanofibers bond and adhere to the substrate as they solidify.

Filtration Performance

Table 2 illustrates one of the unexpected benefits of using the thin, depth filtration nanofiber media of the various embodiments described herein. Table 2 compares the dust holding capacity of four filter media, Media A, Media D, Media E and Media F. These results were obtained using ISO 5011: 2014 Inlet air cleaning equipment for internal combustion engines and compressors Performance testing, but using the indicated test dust. It shows that the Media A and D of the various embodiments described herein exhibit greater dust holding capacity than conventional Media E and F, when challenged with PTI 0-3 micron Test Dust or with ISO Fine Test Dust. ISO Fine Test Dust is specified in ISO 12103-1:1997 Road vehicles—Test dust for filter evaluation. PTI 0-3 micron Test Dust is a related finer test dust whose particle size distribution is truncated at 3 microns and provides a more challenging test. As shown, the enhanced dust holding capacity of the various embodiments described herein is most noticeable with this finer dust. In one embodiment, the composite filter media has a dust capacity of at least 58 g/m$^2$, at least 60 g/m$^2$, or at least 61 g/m$^2$, when challenged with PTI (Powder Technology Inc.) 0-3 micron Test Dust. In one embodiment, the composite filter media has a dust capacity of at least 195 g/m$^2$, at least 197 g/m$^2$, or at least 200 g/m$^2$, when challenged with ISO Fine Test.

TABLE 2

Dust Capacity Performance of Exemplary Nanofiber Composite Filter Media

| Filter Media | PTI 0-3 Test Dust g/m$^2$ | ISO Fine Test Dust g/m$^2$ |
|---|---|---|
| A | 61.0 | 197.4 |
| D | 61.0 | 202.7 |
| E | 56.7 | 193.1 |
| F | 56.9 | 188.9 |

Air Filter Test Data

Figure 8:
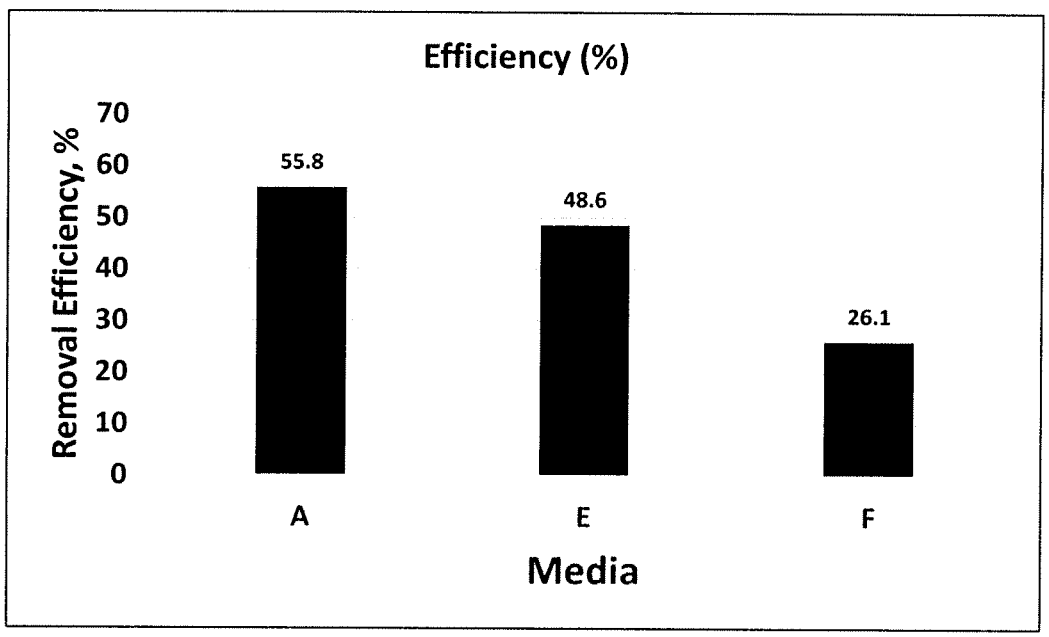
FIG. 8 shows initial removal efficiency at 0.3 μm for Media A, E, and F.

FIG. 8 compares the initial removal efficiency for 0.3 μm particles, the most penetrating particle size for air filtration, for Media A, E, and F. The media were tested using NIOSH Procedure No. RCT-APR-STP-0051, 0052, 0053, 0054, 0055, 0056 Rev. 1.1, "Determination of Particulate Filter Penetration to Test Against Liquid Aerosols for Negative Pressure, Air-Purifying Respirators Standard Testing Procedure (STP)", National Institute for Occupational Safety and Health (Pittsburgh, Pa., 2005), with a TSI 8130 Automated Filter Tester and 0.3 μm oil droplets as the contaminant. Media A is an embodiment of the various embodiments described herein, while Media E and F are conventional media. FIG. 8 shows improved initial removal at this most challenging particle size for Media A, compared to that observed for Media E and F. This is contrary to expectations, as Media A possesses a larger fiber diameter than Media E and F. These results prove that the improved composite filter media of the various embodiments described herein use depth filtration in addition to the surface filtration used in conventional media, which offers unexpected improvement in the removal of the very fine 0.3 μm particles. In one embodiment, the composite filter media has an initial removal efficiency for 0.3 μm particles of at least 50%, at least 53%, or at least 55%.

Thinner Media E and F are more than 7% lower in removal than Media A, even though their fiber diameters are smaller. This demonstrates the benefits of thicker media with broad nanofiber size distribution to improve removal. In engine air intake filtration, conventional media is designed to establish and support a dust cake, which provides much of the contaminant removal. In the standard method of evaluating the performance of engine air intake filters, SAE J726, filter life and pressure drop is controlled by the rate of formation and characteristics of the dust cake. A thin nanofiber layer, as in Media E, F, and G, functions as a surface-type filter and is desirable in that it may enhance initial removal efficiency and aid in the establishment of a dust cake. In contrast, the improved nanofiber composite media additionally utilizes depth filtration to enhance both contaminant removal and dust holding capacity.

Figure 9:
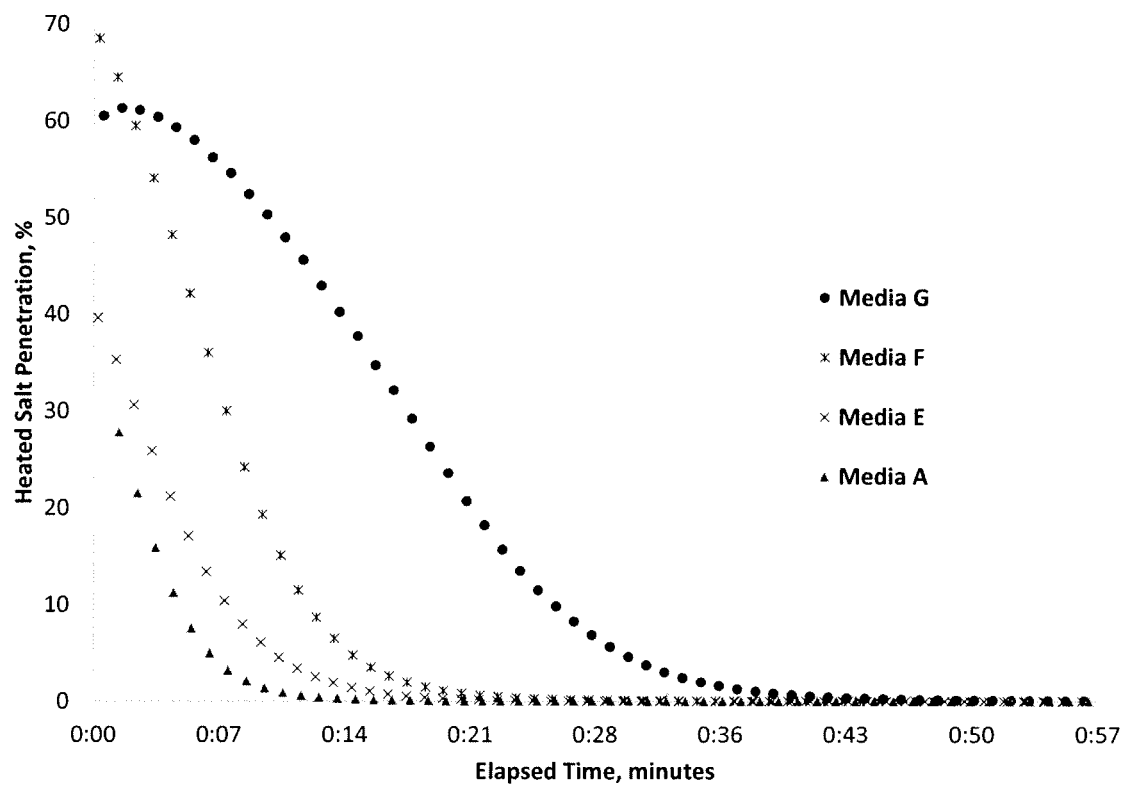
FIG. 9 shows salt penetration and filter life for Media A, E, F, and G.

FIG. 9 compares salt penetration as a function of time for Media A, E, F, and G, where E, F, and G are conventional media and Media A is an embodiment of the various embodiments described herein. The media were tested using NIOSH Procedure No. RCT-APR-STP-0051, 0052, 0053, 0054, 0055, 0056 Rev. 1.1, "Determination of Particulate Filter Penetration to Test Against Liquid Aerosols for Negative Pressure, Air-Purifying Respirators Standard Testing Procedure (STP)", National Institute for Occupational Safety and Health (Pittsburgh, Pa., 2005), with a TSI 8130 Automated Filter Tester and NaCl as the contaminant. Media A provides lower penetration (higher removal), both initially and throughout its life, compared to the conventional Media E, F and G. Thus, performance is not only superior initially, but throughout the life of the filter. This is the result of its broader nanofiber diameter distribution, three dimensional structure, and thickness that enable the media to utilize depth filtration, while remaining relatively thin.

Figure 10:
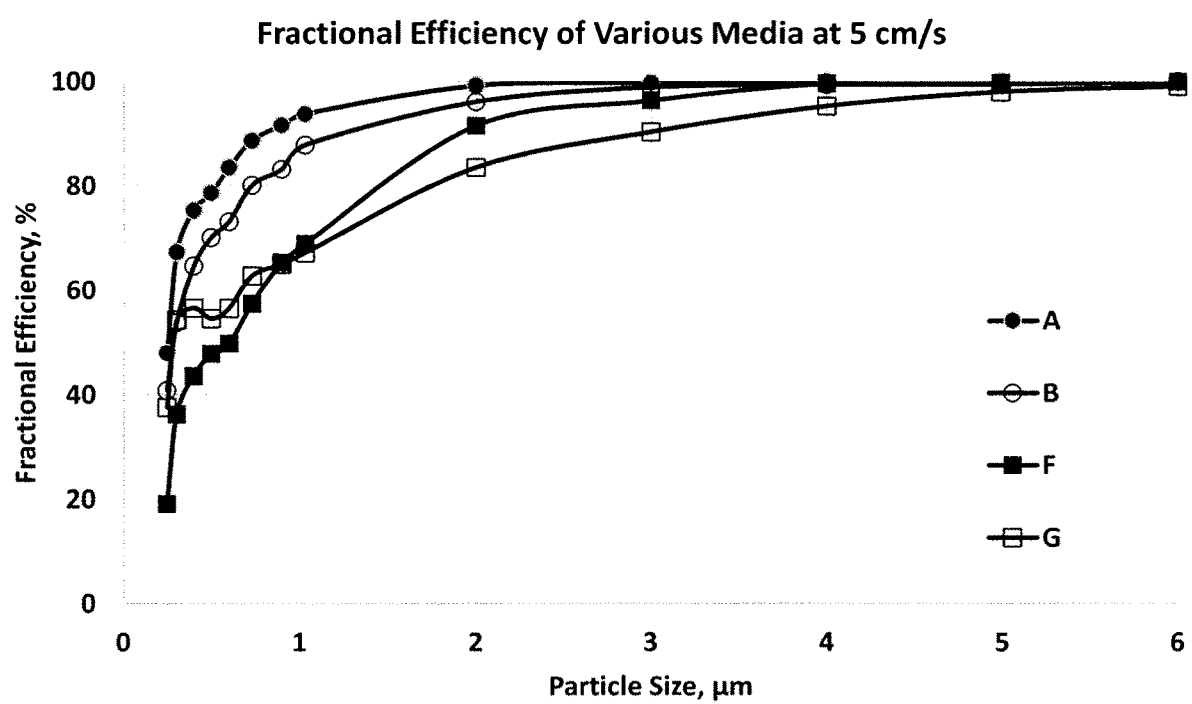
FIG. 10 shows fractional efficiency for Media A, B, F, and G.

FIG. 10 compares the fractional efficiency of Media A, B, F, and G as a function of particle size. The media were tested according to a modified ISO/TS 19713-1:2010 (Road vehicles—Inlet air cleaning equipment for internal combustion engines and compressors—Part 1: Fractional efficiency testing with fine particles), which was modified by using Powder Technologies Inc. (PTI) 0-20 μm test dust, instead of KCl salt, as the contaminant for measuring fractional efficiency. The media of the various embodiments described herein, Media A and B, exhibit significantly higher fractional efficiency at all sizes compared to conventional Media F and G, most notably at the particle sizes smaller than about 2 μm.

Media A and B exhibit higher removal at all sizes than thinner prior art nanofiber composite media F and G, even though they utilize finer fibers. Thus, below a critical threshold thickness, the full benefit of finer fibers is not fully utilized. The ability to achieve high removal with coarser nanofiber, a broader nanofiber diameter distribution, and polymeric masses is advantageous because it provides design flexibility. Coarser nanofiber tends to be structurally stronger, providing additional support to the three dimensional structure of the filter media. This, in combination with the broader size distribution, results in reduced penetration over the life of the filter and better protection for an engine.

Figure 11:
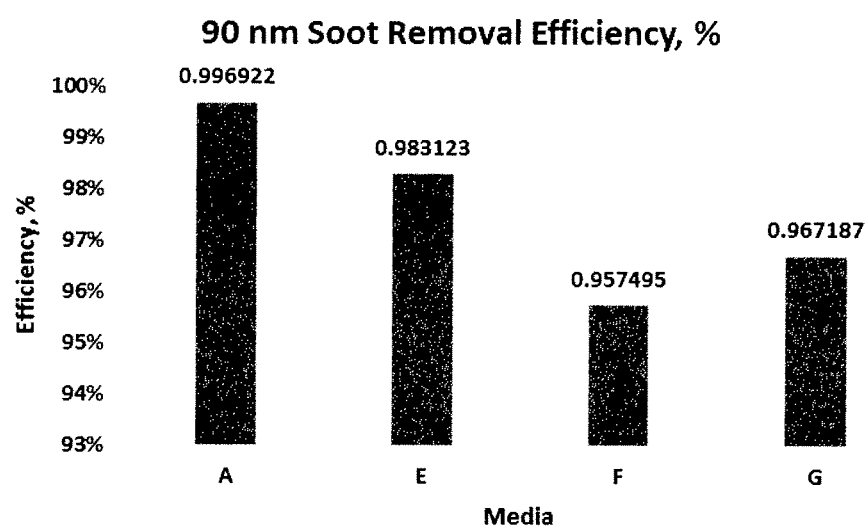
FIG. 11 shows soot removal efficiency at 90 nm for Media A, E, F, and G.

FIG. 11 shows soot removal efficiency at 90 nm for Media A, E, F, and G. Improved nanofiber composite Media A exhibits significantly better soot removal capabilities than thinner conventional composite Media E, F and G, which have smaller fiber diameter and would otherwise be expected to exhibit better removal.

The combination of nanofiber with greater geometric standard deviation for fiber diameter and thickness within the defined range results in unexpectedly higher capacity with lower contamination passing through the filter over its life than prior art media. This is further enhanced when polymeric masses in the media provide additional three dimensional support to its overall structure.

The air filtration data of FIGS. 8 to 11 demonstrate unexpected benefits for the improved nanofiber composite media with respect to dust penetration over the life of the filter (filter media), and capacity compared to conventional nanofiber media. This is the result of the combination of its nanofiber geometric diameter and standard deviation and nanofiber layer thickness, and is further enhanced by the polymeric masses within the structure of the media. In contrast to conventional nanofiber composite media, the improved nanofiber composite media utilizes the three dimensional structure of the nanofiber layer to increase removal and capacity, and decrease penetration over the life of the filter media. Conventional nanofiber composite media, which rely more heavily on surface filtration, do not take full advantage of slip flow conditions. The three dimensional structure of the improved nanofiber composite media is created and maintained by a broad nanofiber diameter distribution, which may be further enhanced by the presence of polymeric masses within its structure. To take advantage of this, the nanofiber layer needs a minimal thickness of about 1 μm or nanofiber basis weight greater than about 0.7 to about 0.9 g/m². For thicknesses greater than about 100 μm and ideally greater than approximately 50 pin (nanofiber basis weight greater than about 9 to about 20 g/m²), the benefits of this optimized structure diminish in air filtration.

Benefits of Improved Nanofiber Composite Media in Air Filtration

Engine air filters utilize surface filtration to induce the formation of a dust cake. The dust cake serves as the primary filtration medium, e.g., during SAE J726 air filter tests. Nanofibers facilitate cake formation and increase removal with a lower pressure drop penalty than coarser fibers, but their practical use in air filtration has largely been limited to surface filtration. During production and post-production processes, nanofibers tend to collapse and compress so the lofty three-dimensional structure preferred for depth filtration is not achieved. Various mechanisms for incorporating particulate spacers into nanofiber have been used with limited success to address this. However, these mechanisms add cost and complexity to the manufacturing process and have the potential to be swept downstream and contaminate the cleaned, filtered air. The present disclosure describes that the three dimensional structure of nanofiber media can be stabilized through the use of nanofibers with broad fiber diameter distribution, and/or by incorporating polymeric masses within the nanofiber structure to provide points of attachment and surface texture. This enables nanofiber to be used as depth media with increased dust holding capacity. A range of thicknesses for the nanofibers as defined unexpectedly provides greater capacity and reduced penetration over the life of the filter compared to conventional media.

Liquid Filtration

The composite filter media disclosed herein may also be used for liquid filtration processes. Specific for liquid applications, it is desirable for the substrate layer to possess a Frasier permeability of less than 60 cfm. Media H, J, K and L are examples of nanofiber composite media that may be used for liquid (e.g., fuel) filtration. Media J and L are developmental media demonstrating various examples and embodiments of the improved nanofiber composite media. Media H, I and K are representative examples of conventional nanofiber composite media. More specifically, Media H and I are examples of thicker conventional nanofiber composite media that have been or are available on the market. It is noteworthy that Media H is commonly referred to as nanofiber filter media, but has a geometric mean fiber diameter of 0.64 μm. This is larger than what is considered to be a nanofiber for purposes of this disclosure and is too large to provide the required high efficiency in the improved nanofiber composite media.

Media H, J, K and L all possess fine layers of polyester meltblown fiber upstream of the nanofiber layer to increase dust-holding capacity, such as described in U.S. Pat. Nos. 8,440,083, 7,887,704, or U.S. Pat. No. 8,678,202. Media J and L are examples of the improved nanofiber composite media, but Media J is thinner and has a lower nanofiber basis weight than Media L. Media H and K are thicker conventional nanofiber composite media for fuel applications. The nanofiber layers of Media J and L are applied to the same type of cellulose substrate and for Media H and K to a polyester substrate.

The basis weight of the nanofiber layer is provided in Tables 1A and 1B above and FIG. 7 shows nanofiber layer thicknesses plotted as a function of nanofiber basis weight for Media A, B, C, D, E, F, G, H, I, J, K, and L. Media H, J, K and L all exhibit nanofiber layer thicknesses greater than or equal to 1 μm and nanofiber basis weight greater than 0.7 g/m², and, more particularly, greater than or equal to 0.9 g/m².

Increasing the thickness of the nanofiber layer alone may not result in depth filtration as the inherent structural weakness of the nanofiber may cause them to compress and collapse upon themselves. The combination of thickness with the broad nanofiber diameter distribution results in a lofty, porous fiber structure whose entire depth may be utilized in contaminant removal. In liquid filtration, depth filtration is preferred in order to ensure high contaminant removal and long life with these more viscous fluids. Certain nanofiber liquid filtration media exhibit a thickness greater than about 100 μm, although U.S. Pat. Nos. 8,360,251 and 8,517,185 disclose minimum nanofiber layer thicknesses of about 10 and about 100 μm when used in combination with additional upstream layers of filter media, and U.S. Pat. No. 9,199,185 discloses a minimum nanofiber layer thickness of about 50 μm for coalescence applications. Various embodiments provided herein differ from these in several ways.

Further, the composite filter media according to various embodiments of the present invention is formed by applying nanofibers in a viscoelastic state directly onto the substrate, while prior art nanofiber liquid filtration media is formed by compositing two or more layers of filter media together. This results in a thinner nanofiber layer of 1 to 100 microns, and ideally of 1 to 50 microns thick compared to conventional nanofiber filter media for liquid applications.

Benefits of Improved Nanofiber Composite Media in Liquid (Fuel) Filtration

Figure 12:
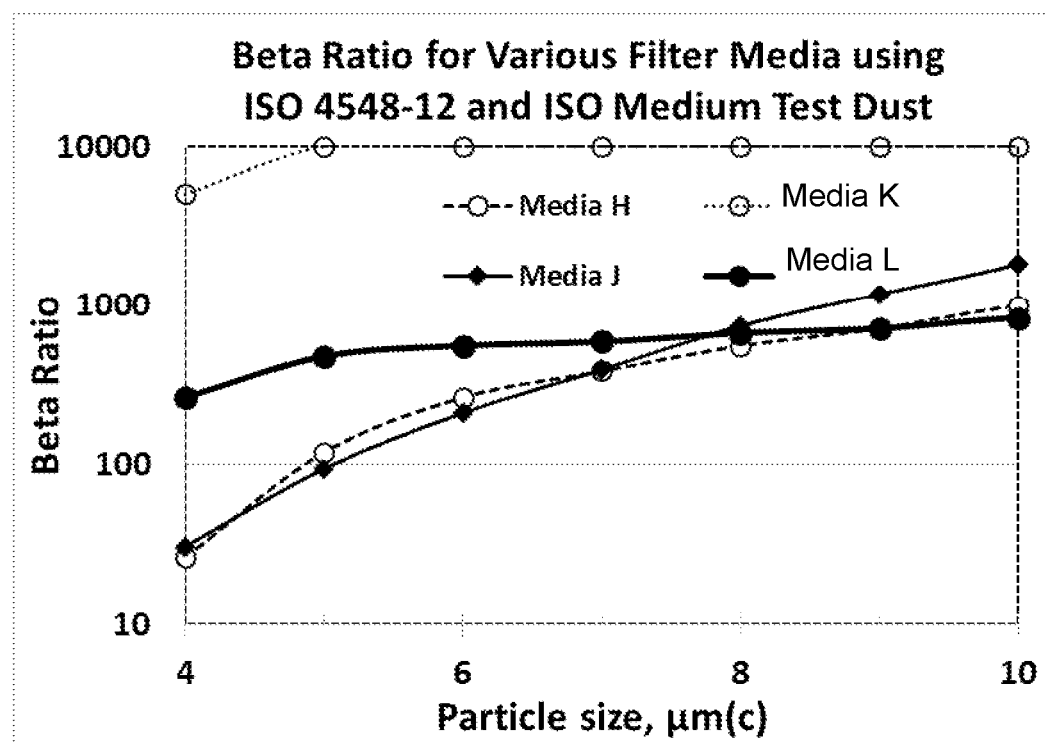
FIG. 12 shows the beta ratio as a function of particle size for Media H, I, J, and K.

The performance benefits of improved nanofiber composite media relative to other nanofiber composite media in liquid filter applications, such as diesel fuel filtration, was demonstrated using Media H, J, K, and L whose physical properties are described in Table 1A and 1B. The performance of Media H, J, K and L were measured using the ISO 4548-12 multipass filter test and ISO Medium Test Dust, as shown in FIG. 12. The discussion will largely focus on Beta ratio results for fine particles in the 4-10 μm(c) size range, as the nanofiber layer largely determines contaminant removal, particularly at smaller particle sizes.

FIG. 12 shows time-weighted beta ratio as a function of particle size. Beta ratio is defined as the ratio of the number concentration of particles larger than the indicated size upstream of a filter to the downstream number concentration larger than the same size. Media K exhibited the highest levels of contaminant removal, followed by improved nanofiber composite Media L. These two media have similar fiber diameter, but the nanofiber layer of Media K is nearly 6× greater than that of Media L. Media H and J exhibited similar lower beta ratios at the smaller sizes, even though the improved nanofiber composite Media J is 10× thinner than Media H. Since the improved media is thinner, the associated cost is reduced and/or more media can be packaged in a given volume. These are important considerations while meeting the requirements of demanding liquid filtration applications, including fuel filtration for high pressure common rail diesel engines and high pressure hydraulic applications.

Figure 13:
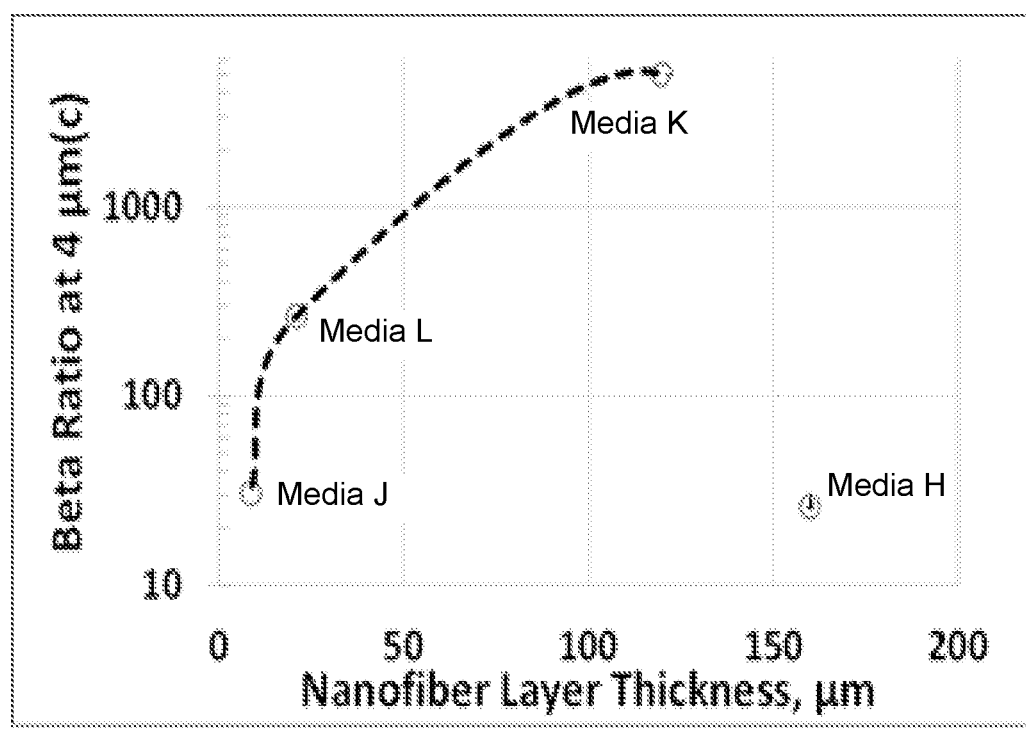
FIG. 13 shows beta ratio results at 4 μm(c) as a function of nanofiber layer thickness for Media H, I, J, and K.

FIG. 13 demonstrates the import of nanofiber layer thickness on removal. Beta ratio results at 4 μm(c) are shown. When the beta ratio data for Media J, K and L which have similar fiber diameter, are plotted as a function of nanofiber layer thickness, beta ratio increases sharply with thickness above 1-2 and approaches a plateau above about 100 μm. For thickness less than 1-2 μm, the data suggests the benefit is inconsequential for fuel filtration. For thicknesses greater than about 100 μm, incremental gains in Beta Ratio are offset by increased cost and reduced number of pleats that can be packaged in a given volume. The data suggests that the ideal range of thicknesses is between about 1 and about 100 μm (nanofiber basis weight between about 0.7 and about 20 g/m$^2$), and more particularly between about 5 and about 100 μm (nanofiber basis weight between about 1.4 and about 20 g/m$^2$), and even more particularly between about 15 and about 50 μm (nanofiber basis weight between about 3 and about 10 g/m$^2$). At smaller thickness, removal is significantly less and approaches that of the base media. At larger thickness, the benefit is negligible compared to the increased amount of media required. Factors other than thickness also influence removal, such as fiber diameter, as shown by Media H. Media J, K and L have fiber diameters about half the diameter of Media H, yet exhibit better overall performance. Media L is 8× thinner than Media H, yet exhibits nearly an order of magnitude higher Beta Ratio. Media J exhibits a slightly higher Beta Ratio than Media H, yet is 18× thinner.

In order to achieve these benefits, the three dimensional structure of the nanofiber layer must be protected to facilitate depth filtration. Broader nanofiber diameter distribution, as measured by the geometric standard deviation for diameter, helps achieve this. Existing technologies are silent with regards to the importance of having a broad nanofiber diameter distribution or polymeric masses in order to create a lofty structure that facilitates hybrid surface-depth filtration. The presence of polymeric masses in the nanofiber layer provides further strength to the nanofiber structure, anchor points for fibers, and a textured surface to the nanofiber layer. For media processing and element construction, the thin nanofiber layer is applied to a stiff, open substrate, such as resin-coated cellulose or woven mesh as previously described. In some embodiments, the thin nanofiber layer is preceded by upstream layers of coarser fibers, such as polymeric meltblown fibers to protect the nanofiber layer during processing and enhance filter life.

Moreover, benefits of the embodiments described herein are not limited to air filtration. In fuel filtration, depth filtration is needed to meet the demanding contaminant removal and filter life requirements for diesel fuel filtration applications. Depth nanofiber composite media has been used to meet these stringent requirements, but it is desirable to achieve these high levels of removal with significantly thinner nanofiber layers in order to obtain potentially longer filter life and/or reduced cost. With nanofiber layer thickness approaching the dimensions of contaminant particles (1-100 μm), the benefits of both surface and depth filtration may be realized. At smaller thickness, the media begins to behave as a surface filter and plugs quickly. At higher thicknesses, additional improvements in removal and capacity come at a high cost with marginal benefit. Unexpectedly, the acceptable levels of performance may be obtained by decreasing the thickness of the nanofiber layer as described in this disclosure.

The properties of the composite media described herein provide enhanced filter performance when tested as flat sheets of media. The enhanced performance may be even more apparent when the composite media are used in filter media packs, filter elements, and filter assemblies. This additional benefit is apparent for conventional pleated filters or cartridges, as well as for more advanced filter designs and pleat packs, such as tetrahedral pleated structures, "fluted" pleat packs, or other filter using folded media packs or structures. Tetrahedral pleated structures are described, for example, in U.S. Pat. No. 8,397,920, the contents of which are incorporated herein by reference. Fluted pleat packs are described, for example, in U.S. Pat. No. 9,084,957, the contents of which are incorporated herein by reference. Examples of additional filter elements that can incorporate the composite media described herein include those described in U.S. Pat. Nos. 6,902,598, 6,149,700 and 6,375,700, the contents of which are incorporated herein by reference. Use of the media is not limited to these examples.

As used herein, the singular terms "a," "an," and "the" include plural referents unless the context clearly dictates otherwise. Thus, for example, reference to a compound can include multiple compounds unless the context clearly dictates otherwise.

As used herein, terms such as "about" are used to describe and account for small variations. When used in conjunction with an event or circumstance, the terms can refer to instances in which the event or circumstance occurs precisely as well as instances in which the event or circumstance occurs to a close approximation. For example, when used in connection with a numerical value, the terms can refer to a range of variation of less than or equal to ±10% of that numerical value, such as less than or equal to ±5%, less than or equal to ±4%, less than or equal to ±3%, less than or equal to ±2%, or less than or equal to ±1%.

Additionally, amounts, ratios, and other numerical values are sometimes presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified. For example, a ratio in the range of about 1 to about 200 should be understood to include the explicitly recited limits of about 1 and about 200, but also to include individual ratios such as about 2, about 3, and about 4, and sub-ranges such as about 10 to about 50, about 20 to about 100, and so forth.

In the foregoing description, it will be readily apparent to one skilled in the art that varying substitutions and modifications may be made to the invention disclosed herein without departing from the scope and spirit of the invention. The invention illustratively described herein suitably may be practiced in the absence of any element or elements, limitation or limitations, which is not specifically disclosed herein. The terms and expressions which have been employed are used as terms of description and not of limitation, and there is no intention that in the use of such terms and expressions of excluding any equivalents of the features shown and described or portions thereof, but it is recognized that various modifications are possible within the scope of the invention. Thus, it should be understood that although the present invention has been illustrated by specific embodiments and optional features, modification and/or variation of the concepts herein disclosed may be resorted to by those skilled in the art, and that such modifications and variations are considered to be within the scopes of this invention.

What is claimed is:

1. A composite filter media, comprising at least one nanofiber layer bonded to a substrate layer, the at least one nanofiber layer comprising a plurality of nanofibers, each of the plurality of nanofibers having a geometric mean diameter of 0.1 to 0.5 µm, the at least one nanofiber layer having a thickness of about 2.9 µm to 21 µm and a nanofiber layer basis weight of 0.9 g/m² to 5 g/m², wherein the at least one nanofiber layer further comprises polymeric masses incorporated therein, the polymeric masses formed from clumps of nanofiber and polymeric beads,
wherein:
the polymeric masses are made of the same polymer as the plurality of nanofibers, and the polymeric masses are embedded within the plurality of nanofibers,
at least some of the polymeric masses are not located at an interface between the at least one nanofiber layer and the substrate layer, and
the plurality of nanofibers have a geometric standard deviation of the geometric mean diameter of greater than 1.4.

2. The composite filter media of claim 1, wherein the geometric standard deviation is in the range of 1.5 to 2.0.

3. The composite filter media of claim 1, wherein the polymeric masses have an area equivalent diameter of larger than 1 µm and cover 1% to 25% of a media surface area.

4. The composite filter media of claim 3, wherein the polymeric masses cover 2% to 5% of the media surface area.

5. The composite filter media of claim 1, wherein some of the polymeric masses are located at an interface between the at least one nanofiber layer and the substrate layer to help secure the at least one nanofiber layer to the substrate layer.

6. The composite filter media of claim 1, wherein the polymeric masses provide anchor points for the plurality of nanofibers and create a three dimensional surface to the at least one nanofiber layer.

7. The composite filter media of claim 1, wherein the polymeric masses have a diameter at least the thickness of the at least one nanofiber layer and provide anchor points for the plurality of nanofibers.

8. The composite filter media of claim 1, wherein the polymeric masses have area equivalent diameters in the range of 5 µm to 130 µm.

9. The composite filter media of claim 1, wherein the substrate layer comprises coarse fibers having a geometric mean fiber diameter of larger than 1 µm.

10. The composite filter media of claim 9, wherein the coarse fibers are selected from the group consisting of cellulose, polyester, polyamide, glass and combinations thereof.

11. The composite filter media of claim 1, wherein the at least one nanofiber layer is upstream of the substrate layer, and wherein the composite filter media is free of an additional layer upstream of the at least one nanofiber layer.

12. The composite filter media of claim 1, wherein the composite filter media is a hybrid surface-depth filter.

13. The composite filter media of claim 1, wherein the polymeric masses comprise:
a first polymeric mass having a first diameter; and
a second polymeric mass having a second diameter.

14. The composite filter media of claim 1, wherein the geometric mean diameter of each of the plurality of nanofibers is in the range of 0.19 µm to 0.33 µm.

* * * * *